US012587664B2

(12) United States Patent
Presta et al.

(10) Patent No.: US 12,587,664 B2
(45) Date of Patent: Mar. 24, 2026

(54) METHOD FOR LEARNED IMAGE COMPRESSION AND RELATED AUTOENCODER

(71) Applicants: SISVEL TECHNOLOGY S.R.L., None (IT); UNIVERSITÀ DEGLI STUDI DI TORINO, Turin (IT); INSTITUT MINES TELECOM, Palaiseau (FR)

(72) Inventors: Alberto Presta, Azzano Decimo (IT); Attilio Fiandrotti, Turin (IT); Enzo Tartaglione, Nardo (IT); Marco Grangetto, Pinerolo (IT)

(73) Assignees: Sisvel Technology S.R.L., None (IT); Universita Degli Studi Di Torino, Turin (IT); Institut Mines Telecom, Palaiseau (FR)

( * ) Notice: Subject to any disclaimer, the term of this patent is extended or adjusted under 35 U.S.C. 154(b) by 0 days.

(21) Appl. No.: 18/758,390

(22) Filed: Jun. 28, 2024

(65) Prior Publication Data

US 2025/0088648 A1     Mar. 13, 2025

(30) Foreign Application Priority Data

Sep. 11, 2023     (IT) ........................ 102023000018537

(51) Int. Cl.
*H01L 29/94*     (2006.01)
*G06N 3/0455*     (2023.01)
(Continued)

(52) U.S. Cl.
CPC ........... *H04N 19/42* (2014.11); *G06N 3/0455* (2023.01); *H04N 19/124* (2014.11); *H04N 19/91* (2014.11)

(58) Field of Classification Search
CPC ...... H04N 19/42; H04N 19/124; H04N 19/91; H04N 19/13; H04N 19/147; G06N 3/0455; G06N 3/047; G06N 3/084; G06T 9/002
See application file for complete search history.

(56)     References Cited

U.S. PATENT DOCUMENTS

| 2023/0336738 | A1* | 10/2023 | Ding | G06N 3/0455 |
| 2024/0283954 | A1* | 8/2024 | Dees | G06T 9/002 |
| 2024/0323416 | A1* | 9/2024 | Ryder | H04N 19/172 |

OTHER PUBLICATIONS

Siwei Ma et al., *Image and Video Compression with Neural Networks: A Review*, IEEE Transactions on Circuits and Systems for Video Technology, Apr. 2019, pp. 1-16.
(Continued)

*Primary Examiner* — Joseph Suh
(74) *Attorney, Agent, or Firm* — Workman Nydegger; Dana L. Tangren

(57)     ABSTRACT

A method for learned image compression implemented in an autoencoder includes: a) extracting from an image a latent space by the learnable encoder; b) quantizing the latent space by a quantizer to obtain a quantized latent space; c) entropy coding the quantized latent space by an entropy encoder to obtain a bitstream, wherein an entropy model used to encode the latent space is represented by a probability distribution; d) entropy decoding the bitstream by an entropy decoder to obtain an entropy decoded bitstream; e) feeding the entropy decoded bitstream to the decoder; f) recover a reconstructed image by the decoder; g) training the autoencoder via standard gradient descent of the backpropagated error gradient by finding learnable parameters of the learnable encoder and of the decoder that minimize a rate distortion cost function, wherein the entropy encoder is based on a differentiable formulation of a soft frequency counter.

16 Claims, 10 Drawing Sheets

(51) Int. Cl.
  *H04N 19/124* (2014.01)
  *H04N 19/42* (2014.01)
  *H04N 19/91* (2014.01)

(56) References Cited

OTHER PUBLICATIONS

Johannes Ballé et al., *End-to-End Optimized Image Compression*, Published on a Conference paper at ICLR 2017, 2017, pp. 1-27.

Johannes Ballé et al., *Variational Image Compression with a Scale Hyperprior*, Published as a Conference paper at ICLR 2018, 2018, pp. 1-23.

David Minnen et al., *Joint Autoregressive and Hierarchical Priors for Learned Image Compression*, 32nd Conference on Neural Information Processing Systems, 2018, pp. 1-10.

Jooyoung Lee et al., *Context-Adaptive Entropy Model for End-to-End Optimized Image Compression*, Published as a Conference paper at ICLR 2019, 2019, pp. 1-20.

David Minnen et al., *Channel-Wise Autoregressive Entropy Models for Learned Image Compression*, Google Research, Jul. 17, 2020, pp. 1-16.

Chunhui Yang et al., *Graph-Convolution Network for Image Compression*, 2021 IEEE International Conference on Image Processing (ICIP), 2021, pp. 1-5.

Zhengxue Cheng et al., *Learned Image Compression with Discretized Gaussian Mixture Likelihood and Attention Modules*, Mar. 30, 2020, pp. 1-15.

Renjie Zou et al., *The Devil is in the Details: Window-Based Attention for Image Compression*, National Laboratory of Pattern Recognition (NLPR) of Institute of Automation (CASIA) & University of Chinese Academy of Sciences, 2020, pp. 1-10.

Vivek K. Goyal, *Theoretical Foundations of Transform Coding*, IEEE Signal Processing Magazine, Sep. 2001, pp. 9-21.

Robert M. Gray et al., *Quantization*, IEEE Transactions of Information Theory, vol. 44, No. 6, Oct. 1998. pp. 2325-2383.

Jae-Han Lee et al., *DPICT: Deep Progressive Image Compression Using Trit-Planes*, May 6, 2022, pp. 1-10.

Kodak, *Kodak Lossless True Color Image Suite*, http://r0k.us/graphics/kodak/, Jan. 27, 2013, pp. 1-4.

*CLIC: Challenge on Learned Image Compression*, https://clic.compression.co/2021/, 2001, pp. 1-2.

Karsten Suehring et al., *Joint Video Exploration Team*, 7th Meeting, Torino, Italy, Jul. 13-21, 2017, pp. 1-4.

Jean Begaint et al., *CompressAI: a PyTorch Library and Evaluation Platform for End-to-End Compression Research*, Nov. 5, 2020, https://github.com/InterDigitalInc/CompressAI/blob/master/examples/train.py, pp. 1-19.

Gisle Bjontegaard, *ITU—Telecommunications Standardization Sector*, Study Group 16 Question 6, Apr. 2-4, 2001, pp. 1-4.

Alberto Presta et al., *A Differentiable Entropy Model for Learned Image Compression*, Sep. 5, 2023, pp. 1-588, XP93137376.

Italian Search Report dated Mar. 4, 2024, issued in Italian Application No. 20230018537, filed Sep. 11, 2023.

\* cited by examiner

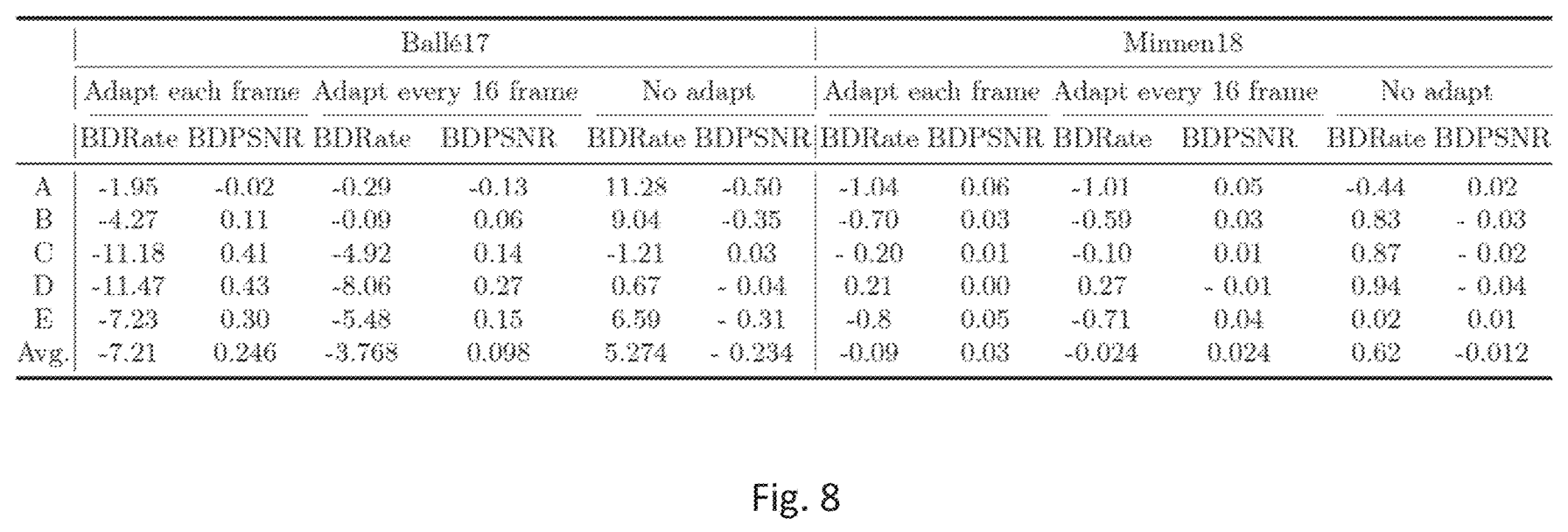

| | Balls17 | | | | | | Mimmen18 | | | | | |
|---|---|---|---|---|---|---|---|---|---|---|---|---|
| | Adapt each frame | | Adapt every 16 frame | | No adapt | | Adapt each frame | | Adapt every 16 frame | | No adapt | |
| | BDRate | BDPSNR | BDRate | BDPSNR | BDRate | BDPSNR | BDRate | BDPSNR | BDRate | BDPSNR | BDRate | BDPSNR |
| A | -1.95 | -0.02 | -0.28 | -0.13 | 11.28 | -0.50 | -1.04 | 0.06 | -1.01 | 0.05 | -0.44 | 0.02 |
| B | -4.27 | 0.11 | -0.08 | 0.06 | 9.04 | -0.55 | -0.70 | 0.03 | -0.59 | 0.03 | 0.83 | -0.03 |
| C | -11.18 | 0.41 | -4.92 | 0.14 | -1.21 | 0.03 | -0.20 | 0.01 | -0.10 | 0.01 | 0.87 | -0.02 |
| D | -11.47 | 0.43 | -8.06 | 0.27 | 0.67 | -0.04 | 0.21 | 0.00 | 0.27 | -0.01 | 0.04 | -0.04 |
| E | -7.23 | 0.50 | -5.48 | 0.15 | 6.59 | -0.31 | -0.8 | 0.05 | -0.71 | 0.04 | 0.02 | 0.01 |
| Avg. | -7.21 | 0.246 | -3.768 | 0.098 | 5.274 | -0.234 | -0.09 | 0.03 | -0.024 | 0.024 | 0.02 | -0.012 |

Fig. 8

METHOD FOR LEARNED IMAGE COMPRESSION AND RELATED AUTOENCODER

CROSS-REFERENCE TO RELATED APPLICATIONS

This application claims prior to Italian Application No. 102023000018537, filed Sep. 11, 2023, which is incorporated herein by specific reference in its entirety.

BACKGROUND OF THE INVENTION

1. The Field of the Invention

The present invention relates to a method for learned image compression. The present invention also relates to an autoencoder implementing the method for learned image compression.

2. The Relevant Technology

End-to-end image compression is gaining momentum as it enables learning the encoder and decoder functions jointly, instead of relying on handcrafted transformations that standard codecs are based on (see Ma S. et al., "Image and video compression with neural networks: A review", IEEE TCSVT, 2019 [reference 1]).

Most designs depend on an autoencoder architecture, leveraging recent advances in deep artificial neural networks.

At the transmitter side, a convolutional encoder extracts, from the image, a vector of features, known as latent space. This vector has lower dimensionality than the image, achieving preliminary compression. The vector is further quantized, yielding a compressed representation of the image in the form of a bitstream.

At the receiver side, this representation is projected back to the original dimension by a decoder network, recovering the original image.

Encoder and decoder are jointly trained via gradient backpropagation, minimizing some RD (Rate Distortion) cost function in the form $\lambda D+R$, where D is the reconstruction error, R is the rate of the quantized latent space, i.e. the estimated entropy, and regulates the trade-off between these two competing terms.

Several approaches have been proposed to estimate the rate of the latent space.

In Ballé J., Laparra V., and Simoncelli E. P., "End-to-end optimized image compression", ICLR, 2017, [reference 2], the authors built a simple autoencoder with one single latent space, estimating the rate using a parametric function, while in Ballé J., Minnen D., Singh S., Hwang S. J., and Johnston N., "Variational image compression with a scale hyperprior", ICLR, 2018, [reference 3], an ad-hoc neural network has been trained within the overall framework.

Upon this seminal idea, more advanced architectures have been built to improve quantitative results in terms of both rate and distortion.

In reference [3], a scale hyperprior latent space was introduced to capture spatial dependencies within an image, while in Minnen D. et al., "Joint autoregressive and hierarchical priors for learned image compression", Advances in neural information processing systems, 2018, [reference 4], in Lee J. et al., "Context-adaptive entropy model for end-to-end optimized image compression", International Conference on Learning Representations (ICLR), 2019, [reference 5], and in Minnen D., Saurabh S., "Channel-wise autoregressive entropy models for learned image compression", IEEE International Conference on Image Processing, 2020, [reference 6], the authors exploited an autoregressive context model, inspired by their success in probabilistic generative models.

Other proposed solutions were for example to add graph-based modules in the autoencoder to capture non-spatial correlations as in Yang C. et al., "Graph-Convolution Network for Image Compression", IEEE International Conference on Image Processing (ICIP), 2021, [reference 7], to add attention modules as in Cheng, Z. et al., "Learned image compression with discretized gaussian mixture likelihoods and attention modules", CVPR, 2020, [reference 8], or to exploit Swin-transformers as in Zou R. et al., "The devil is in the details: Window-based attention for image compression", CVPR 2022, [reference 9].

With reference to FIG. 1a, in most end-to-end learnable image compression schemes, an encoder-decoder pipeline is implemented as a neural network-based autoencoder 1, following the so-called transform coding approach as described in Goyal, Vivek K., "Theoretical foundations of transform coding", IEEE Signal Processing Magazine, 2001, [reference 10].

The autoencoder 1 is described in reference [2].

A learnable encoder $f_a$ projects an image x into a latent space $y=f_a(x,\theta_f)\in R^{N_c\times N_d}$, where $N_c$ and $N_d$ respectively represent the number and the dimension of the latent space channels, which may be flattened thereby forming a vector, while $\theta_f$ represents learnable parameters of the encoder $f_a$.

The latent space y has a lower dimension than the image x, achieving preliminary compression.

Then, the latent space y is quantized in a quantizer (U|Q) using a function Q, obtaining a quantized latent space $\hat{y}=Q(y)$.

The quantized latent space $\hat{y}$ is entropy coded by an entropy encoder, e.g. by arithmetic coding, producing an actual bitstream.

At the receiver side, the bitstream is entropy-decoded by an entropy decoder and then is fed as input to a decoder $f_s$ that projects it to the original image dimension and recovers the reconstruction $\hat{x}=f_s(\hat{y},\theta_g)$, where $\theta_g$ represents learnable parameters of the decoder.

In the context of learned image compression framework, the entropy model used to encode the latent space y is represented by a probability distribution $p_{\hat{y}}$, and it has the role to approximate the real marginal distribution, which is unknown a priori.

The autoencoder 1 should be trained end-to-end via standard gradient descent of the backpropagated error gradient. Namely, training the autoencoder 1 resolves to finding the learnable parameters $(\theta_f,\theta_g)$ that minimize the cost function:

$$L = \lambda \cdot d(x, \hat{x}) + R(\hat{y}) \qquad (1)$$

where d is a distortion metric, $R(\hat{y})=E[-p_{\hat{y}}(\hat{y})]$ is an estimation of the rate of the latent space, and $\lambda$ controls the RD trade-off between these two competing terms.

However, training the autoencoder via backpropagation requires all the cost function terms to be differentiable, which is not, because a quantization step occurs, and the quantization is not differentiable.

In reference [2], rounding quantization is replaced by adding uniform noise to the latent space y, obtaining $\tilde{y}=y+\Delta$, where $\Delta \sim U(-0.5, 0.5)$. This approach has two advantages: first, the density function $p_{\tilde{y}}$ is a continuous relaxation of the discrete density mass $p_{\hat{y}}$ (see reference [2]); second, the moments of the quantized random variable are the same as those of the original signal plus an additive signal-indepen-dent uniform noise (see Robert M. and Neuhoff D., "Quan-tization, in IEEE transactions on information theory", 1998, [reference 11]).

Another crucial step is to define an effective proxy of the rate R. To tackle this problem, works like those described in references [2], [3], [5] and [8], introduce a parametric function to estimate the density function $p_{\tilde{y}}$ during training, modeling it as a fully factorized model defined as $$p_{\tilde{y}}(\tilde{y}, \psi) = \prod_{i=1}^{c} p_{\tilde{y}_i}(\tilde{y}_i, \psi_i) = \prod_{i=1}^{c} p_{y_i}(y_i, \psi_i) * \mathcal{U}(y_i \mid -0.5, 0.5), \qquad (2)$$

where $*$ represents the convolution operation, and $\psi$ represents the learnable parameters related to the entropy model.

In particular, reference [2] models each marginal of the density function $p_{\tilde{y}}$ with a piecewise linear function where the parameters represent the value of the specific sampling points.

Conversely, in references [3], [8] and Lee J. et al., "DPICT: deep progressive image compression using trit-planes", IEEE/CVF CVPR, 2022 [reference 12], the density function p, is modeled via its cumulative by an auxiliary neural network $\Psi$ trained jointly with the entire image compression framework. The neural network $\Psi$ must guar-antee the theoretical characteristics of a cumulative function, namely the positivity and the boundedness between 0 and 1. In particular, the neural network $\Psi$ is modeled as a cascade of K parametric vector functions $\tau_k$, obtaining $\Psi = \tau_K \circ \tau_{K-1} \circ \tau_1$.

The actual choice of T in references [3], [4] and [8] is:

$$\tau_k = \begin{cases} m_k \cdot (T^k x + b^k) & \text{if } 1 \le k < K \\ \text{sigmoid}(T^k x + b^k) & \text{if } k = K \end{cases}, \qquad (3)$$

where $m_k = x + a^k \odot \odot \tanh$, where tanh represents the non-linearity, $\odot$ represents the elementwise multiplication, and $(T^k, b^k, a^k)$ are vectors of trainable parameters which form the auxiliary neural network $\Psi$.

To respect the cumulative conditions mentioned above, a reparametrization step is performed at each step, by applying the softplus and tanh functions to the vectors of trainable parameters $T^k$ and $b^k$, respectively.

The methods according to the references [3], [8] and [12] implemented an auxiliary neural network $\Psi$ with K=4, obtaining an architecture with around 20000 parameters, depending on the dimension of the latent space.

With the developments of more complex architectures also the modeling of the entropy model became more precise.

With reference to FIG. 2a, the authors of reference [3] added in an autoencoder 2 a hyperprior representation z to capture spatial dependencies among y. In particular, an auxiliary encoder $h_a$ is applied to output $z = h_a(y, \theta_{h_a})$, which is then quantized in the quantizer (U|Q) obtaining $\hat{z}$ and fed to an auxiliary decoder $h_s$ that extracts the scale factor $o^2 = h_s(\hat{z}, \theta_{h_s})$.

In this case, while the probability distribution $p_{\hat{z}}$ model-ling the latent space is a fully-factorized model like in the above indicated equation (2), $p(\hat{y} \mid \hat{z})$ is parameterized as a zero-mean Gaussian distribution with the scale factor equal to $o^2$.

To train the autoencoder 2 of reference [3] described in FIG. 2a, a further term in equation (1) is introduced, representing the rate of the hyperprior space, obtaining the cost function $$L = \lambda \cdot d(x, \hat{x}) + R(\hat{y} \mid \hat{z}) + R(\hat{z}), \qquad (4)$$

where $R(\hat{z})$ is equivalent to the rate term in equation (1), while $R(\hat{y} \mid \hat{z}) = E[-p_{\hat{y}}(\hat{y} \mid \hat{z})]$ is the rate term related to the Gaussian distributed latent space.

Following that, references [4] and [6] exploit a context model Cm, formed by mask convolution and a parameter estimation module, with a mean-scale hyperprior to extract a more accurate entropy model, while reference [8] modeled $p(\hat{y} \mid \hat{z})$ as a mixture of Gaussians and added attention module to the autoencoder 2: both of these architectures are repre-sented in FIG. 2a.

As already mentioned, the above approaches rely on a neural network $\Psi$ for learning a parametric entropy model referring to $\hat{z}$ at training time.

However, this not only impacts the training complexity but also requires a fine-tuning step if some context from where to extract updated statistics was available.

At inference time, uniform scalar quantization over inte-gers is performed, considering L different quantization lev-els uniformly distributed in a symmetric range $$\left[ -\frac{L}{2}, \frac{L}{2} \right],$$

obtaining a bounded latent representation, which is enforced during training.

To deal with the quantization step, uniform noise during training is added as in reference [2] and the entropy model is fully factorized as in equation (2), meaning that each channel of the latent space has its distribution over the quantization levels, and there is no correlation between different channels.

Indicating with $l_i^j$ the i-th quantization level of the j-th channel and with $$\left[ \frac{l_{i-1}^j + l_i^j}{2}, \frac{l_{i+1}^j + l_i^j}{2} \right]$$

its associated quantization interval, the first order entropy $H_{\hat{p}}$ of the probability distribution $p_{\hat{y}}$ is expressed as $$H_{\hat{p}} = -\frac{1}{N_c} \sum_{j=1}^{N_c} H_{\hat{p}_j} = -\frac{1}{N_c} \sum_{j=1}^{N_c} \left[ \sum_{i=1}^{L} \hat{p}_j(l_i^j) \log_2 \hat{p}_j(l_i^j) \right]. \qquad (5)$$

Unfortunately, the fact that the probability distribution $p_{\hat{y}}$ is a discrete distribution makes equation (5) non-differen-tiable, making it impossible to minimize it within a gradient-based optimization framework.

To sum up, all the prior art approaches rely on a neural network to estimate the latent space rate, however not without drawbacks.

First, the neural network requires training itself, adding to the encoder complexity and learning time.

Second, assuming that a temporal context is available, the neural network must be refined, i.e. retrained, on the context.

SUMMARY OF THE DISCLOSURE

The present invention aims at solving these and other problems by providing a method for learned image compression, and a related autoencoder, that reduces the overall training complexity.

A further scope of the present invention is to provide a method for learned image compression, and a related autoencoder, that accelerates rate convergence at training time.

A further scope of the present invention is to provide a method for learned image compression, and a related autoencoder, that are suitable for any learnable image compression scheme.

A further scope of the present invention is to provide a method for learned image compression, and a related autoencoder, that does not require any additional training to update the entropy model when a temporal context is available.

In a nutshell, the method according to the invention proposes a non-parametric model of the latent space entropy distribution as a proxy of the encoding rate.

The method according to the invention models the rate of the quantized latent space as a differentiable function that can be optimized at training time through backpropagation.

The method according to the present invention, and the related autoencoder, estimates the latent space statistical frequencies in a differentiable way, so it can be plugged into the RD cost function as a proxy of the rate at training time.

The proposed technical solution not only fulfills the requirements for learning with standard gradient backpropagation, but is agnostic of the overall autoencoder architecture, and can be adapted without lengthy refinement procedures.

As the entropy model according to the present invention is non-parametric, it reduces the overall complexity and accelerates rate convergence at training time.

Moreover, whenever a temporal context is available, no additional training is required to update the entropy model.

A variety of learned image compression architectures has been experimented, and similar performance for a static entropy model was achieved, with a slight improvement when the model is updated over a temporal context.

According to a first embodiment of the method according to the invention, it is described a method for learned image compression implemented in an autoencoder comprising a learnable encoder and a decoder, said method comprising the steps of:

a) extracting from an image a latent space by means of the learnable encoder;

b) quantizing the latent space by means of a quantizer to obtain a quantized latent space;

c) entropy coding the quantized latent space by means of an entropy encoder to obtain a bitstream, wherein an entropy model used to encode said latent space is represented by a probability distribution;

d) entropy decoding the bitstream by means of an entropy decoder to obtain an entropy decoded bitstream;

e) feeding the entropy decoded bitstream to the decoder;

f) recover a reconstructed image by means of the decoder;

g) training the autoencoder via standard gradient descent of the backpropagated error gradient by finding learnable parameters of the learnable encoder and of the decoder that minimize a rate distortion cost function L, wherein the entropy encoder is based on a differentiable formulation of a soft frequency counter.

According to an aspect of the first embodiment of the method according to the invention, the latent space comprises a number $N_c$ of latent space channels having a dimension $N_d$, and wherein, given a j-th channel of the latent space and a quantization level $l_i^j$ of the j-th channel, the soft frequency counter associates every value of the latent space $y_n^j$ to a weight inversely proportional to the distance with $l_i^j$, where n varies within the same channel and ranges from 1 to $N_d$.

According to a further aspect of the first embodiment of the method according to the invention, the soft frequency counter relies on a scalar function $\phi_i^j$ and a first order entropy $H_{\tilde{p}}$ of a probability distribution $\tilde{p}_j$ for every single channel of the latent space is:

$$H_{\tilde{p}} = -\frac{1}{N_c}\sum_{j=1}^{N_c}H_{\tilde{p}_j} = -\frac{1}{N_c}\sum_{j=1}^{N_c}\sum_{i=1}^{L}SFC\!\left(l_i^j\right)\log_2\left[SFC\!\left(l_i^j\right)\right]$$

where $$SFC\!\left(l_i^j\right) = \frac{\sum_{n=1}^{N_d}\phi_i^j\!\left(y_n^j\right)}{\sum_{m=}^{L}\sum_{n=1}^{N_d}\phi_m^j\!\left(y_n^j\right)}$$

and $$\phi_i^j\!\left(y_n^j\right) = \begin{cases}1-\left(2\cdot\left|y_n^j - l_i^j\right|\right) & \text{if } \left|y_n^j - l_i^j\right| < 0.5 \\ 0 & \text{otherwise}\end{cases}.$$

According to a further aspect of the first embodiment of the method according to the invention, the cost function L is $$L = \lambda\cdot d(x, \hat{x}) + H_{\tilde{p}_y}$$

where $d(x, \hat{x})$ is a reconstruction error, $H_{\tilde{p}_y}$ is a rate of a soft quantized latent space, and $\lambda$ regulates a trade-off between the reconstruction error and the rate of the soft quantized latent space.

According to a second embodiment of the method according to the invention, it is described a method for learned image compression implemented in an autoencoder comprising a learnable encoder and a decoder, the method comprising the steps of:

a) extracting from an image a latent space by means of the learnable encoder;

b) encoding by means of an auxiliary encoder the latent space to capture spatial dependencies among the latent space to obtain a hyperprior representation of the latent space;

c) quantizing the hyperprior representation by means of a quantizer to obtain a quantized hyperprior representation;

d) entropy coding the quantized hyperprior representation by means of an entropy encoder to obtain a bitstream, wherein an entropy model used to encode the quantized hyperprior representation is represented by a probability distribution $p_z$;

e) entropy decoding the bitstream by means of an auxiliary entropy decoder to obtain an entropy decoded bitstream;

f) quantizing the entropy decoded bitstream to obtain a quantized latent space;

g) feeding the entropy decoded bitstream to the decoder;

h) recover a reconstructed image by means of the decoder;

i) training the autoencoder via standard gradient descent of the backpropagated error gradient by finding learnable parameters of the learnable encoder and of the decoder that minimize a rate distortion cost function L, wherein the entropy encoder is based on a differentiable formulation of a soft frequency counter.

According to an aspect of the second embodiment of the method according to the invention, the hyperprior representation comprises a number $N_c$ of latent space channels having a dimension $N_d$, and wherein, given a j-th channel of the hyperprior representation and a quantization level $l_i^j$ of the j-th channel, the soft frequency counter associates every value of the latent hyperprior representation $z_n^j$ to a weight inversely proportional to the distance with $l_i^j$, where n varies within the same channel and ranges from 1 to $N_d$.

According to a further aspect of the second embodiment of the method according to the invention, the soft frequency counter relies on a scalar function $\phi_i^j$ and the first order entropy $H_{\tilde{p}}$ of a probability distribution $\tilde{p}_y$ for every single channel of said latent space is:

$$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC(l_i^j)\log_2\left[SFC(l_i^j)\right]$$

where $$SFC(l_i^j) = \frac{\sum_{n=1}^{N_d}\phi_i^j(y_n^j)}{\sum_{m=1}^{L}\sum_{n=1}^{N_d}\phi_m^j(y_n^j)}$$

and $$\phi_i^j(y_n^j) = \begin{cases} 1 - (2\cdot|y_n^j - l_i^j|) & \text{if } |y_n^j - l_i^j| < 0.5 \\ 0 & \text{otherwise} \end{cases}.$$

According to a further aspect of the second embodiment of the method according to the invention, the cost function L is $$L = \lambda\cdot d(x,\hat{x}) + R(\tilde{y}|\tilde{z}) + H_{\tilde{p}_z}$$

where $d(x,\hat{x})$ is the reconstruction error, $H_{\tilde{p}_z}$ is a rate of a soft quantized latent space, $R(\tilde{y}|\tilde{z})$ is a rate of the hyperprior representation, and $\lambda$ regulates a trade-off between the reconstruction error, the rate of the soft quantized latent space and the rate of the hyperprior representation.

According to a first embodiment of an autoencoder for learned image compression according to the invention, the autoencoder comprises:

a learnable encoder adapted to extract from an image a latent space;

a quantizer adapted to quantize the latent space to obtain a quantized latent space;

an entropy encoder adapted to entropy coding the quantized latent space to obtain a bitstream, wherein an entropy model used to encode the latent space is represented by a probability distribution $p_{\hat{y}}$;

an entropy decoder adapted to decode the bitstream;

means for feeding the entropy decoded bitstream to a decoder adapted to recover a reconstructed image;

means for training the autoencoder via standard gradient descent of the backpropagated error gradient by finding learnable parameters of the learnable encoder and of the decoder that minimize a rate distortion cost function L, wherein the entropy encoder comprises a soft frequency counter based on a differentiable formulation.

According to a first aspect of the first embodiment of the autoencoder for learned image compression according to the invention, the latent space comprises a number $N_c$ of latent space channels having a dimension $N_d$, and wherein, given a j-th channel of the latent space and a quantization level $l_i^j$ of the j-th channel, the soft frequency counter is adapted to associate every value of the latent space $y_n^j$ to a weight inversely proportional to the distance with $l_i^j$, where n varies within the same channel and ranges from 1 to $N_d$.

According to a further aspect of the first embodiment of the autoencoder for learned image compression according to the invention, the soft frequency counter relies on a scalar function $\phi_i^j$ and the first order entropy $H_{\tilde{p}}$ of a probability distribution $\tilde{p}_j$ for every single channel of the latent space is:

$$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC(l_i^j)\log_2\left[SFC(l_i^j)\right]$$

where $$SFC(l_i^j) = \frac{\sum_{n=1}^{N_d}\phi_i^j(y_n^j)}{\sum_{m=1}^{L}\sum_{n=1}^{N_d}\phi_m^j(y_n^j)}$$

and $$\phi_i^j(y_n^j) = \begin{cases} 1 - (2\cdot|y_n^j - l_i^j|) & \text{if } |y_n^j - l_i^j| < 0.5 \\ 0 & \text{otherwise} \end{cases}.$$

According to a further aspect of the first embodiment of the autoencoder for learned image compression according to the invention, the cost function L is $$L = \lambda\cdot d(x,\hat{x}) + H_{\tilde{p}_y}$$

where $d(x,\hat{x})$ is a reconstruction error, $H_{\tilde{p}_y}$ is a rate of the soft quantized latent space, and $\lambda$ regulates a trade-off between the reconstruction error and the rate of the soft quantized latent space.

According to a second embodiment of an autoencoder for learned image compression according to the invention, the autoencoder comprises:

a learnable encoder adapted to extract from an image a latent space;

an auxiliary encoder adapted to encode the latent space to capture spatial dependencies among the latent space to obtain a hyperprior representation of the latent space;

a quantizer adapted to quantize the hyperprior representation to obtain a quantized hyperprior representation;

an entropy encoder adapted to entropy coding the quantized hyperprior representation to obtain a bitstream, wherein an entropy model used to encode the quantized hyperprior representation is represented by a probability distribution $p_{\hat{z}}$;

an auxiliary entropy decoder adapted to entropy decode the bitstream to obtain an entropy decoded bitstream;

a second quantizer adapted to quantize the entropy decoded bitstream to obtain a quantized latent space;

means for feeding the entropy decoded bitstream to a decoder adapted to recover a reconstructed image;

means for training the autoencoder via standard gradient descent of the backpropagated error gradient by finding learnable parameters of the learnable encoder and of the decoder that minimize a rate distortion cost function L, wherein the entropy encoder is based on a differentiable formulation of a soft frequency counter.

According to a first aspect of the second embodiment of an autoencoder for learned image compression according to the invention, the hyperprior representation comprises a number $N_c$ of latent space channels having a dimension $N_d$, and wherein, given a j-th channel of the hyperprior representation and a quantization level $l_i^j$ of the j-th channel, the soft frequency counter associates every value of the hyperprior representation $z_n^j$ to a weight inversely proportional to the distance with $l_i^j$, where n varies within the same channel and ranges from 1 to $N_d$.

According to a further aspect of the second embodiment of an autoencoder for learned image compression according to the invention, the soft frequency counter relies on a scalar function $\phi_i^j$ and the first order entropy $H_{\tilde{p}}$ of a probability distribution $\tilde{p}_j$ for every single channel of the latent space is:

$$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC(l_i^j)\log_2\left[SFC(l_i^j)\right]$$

where $$SFC(l_i^j) = \frac{\sum_{n=1}^{N_d}\phi_i^j(y_n^j)}{\sum_{m=1}^{L}\sum_{n=1}^{N_d}\phi_m^j(y_n^j)}$$

and $$\phi_i^j(y_n^j) = \begin{cases} 1 - (2\cdot|y_n^j - l_i^j|) & \text{if } |y_n^j - l_i^j| < 0.5 \\ 0 & \text{otherwise} \end{cases}.$$

According to a further aspect of the second embodiment of an autoencoder for learned image compression according to the invention, the cost function L is $$L = \lambda\cdot d(x,\hat{x}) + R(\tilde{y}\,|\,\tilde{z}) + H_{\tilde{p}_z}$$

where $d(x,\hat{x})$ is a reconstruction error, $H_{\tilde{p}_z}$ is a rate of a soft quantized latent space, $R(\tilde{y}|\tilde{z})$ is a rate of the hyperprior representation, and $\lambda$ regulates the trade-off between the reconstruction error, the rate of the soft quantized latent space and the rate of the hyperprior representation.

BRIEF DESCRIPTION OF THE DRAWINGS

The invention will be described in detail hereinafter through non-limiting embodiments with reference to the attached Figures, in which:

FIG. 8 shows a table representing gains in terms of BD-Rate and BD-PSNR using as a prior art autoencoders where a neural network estimates the rate;

DETAILED DESCRIPTION OF THE PREFERRED EMBODIMENTS

Figures 1A, 1B:
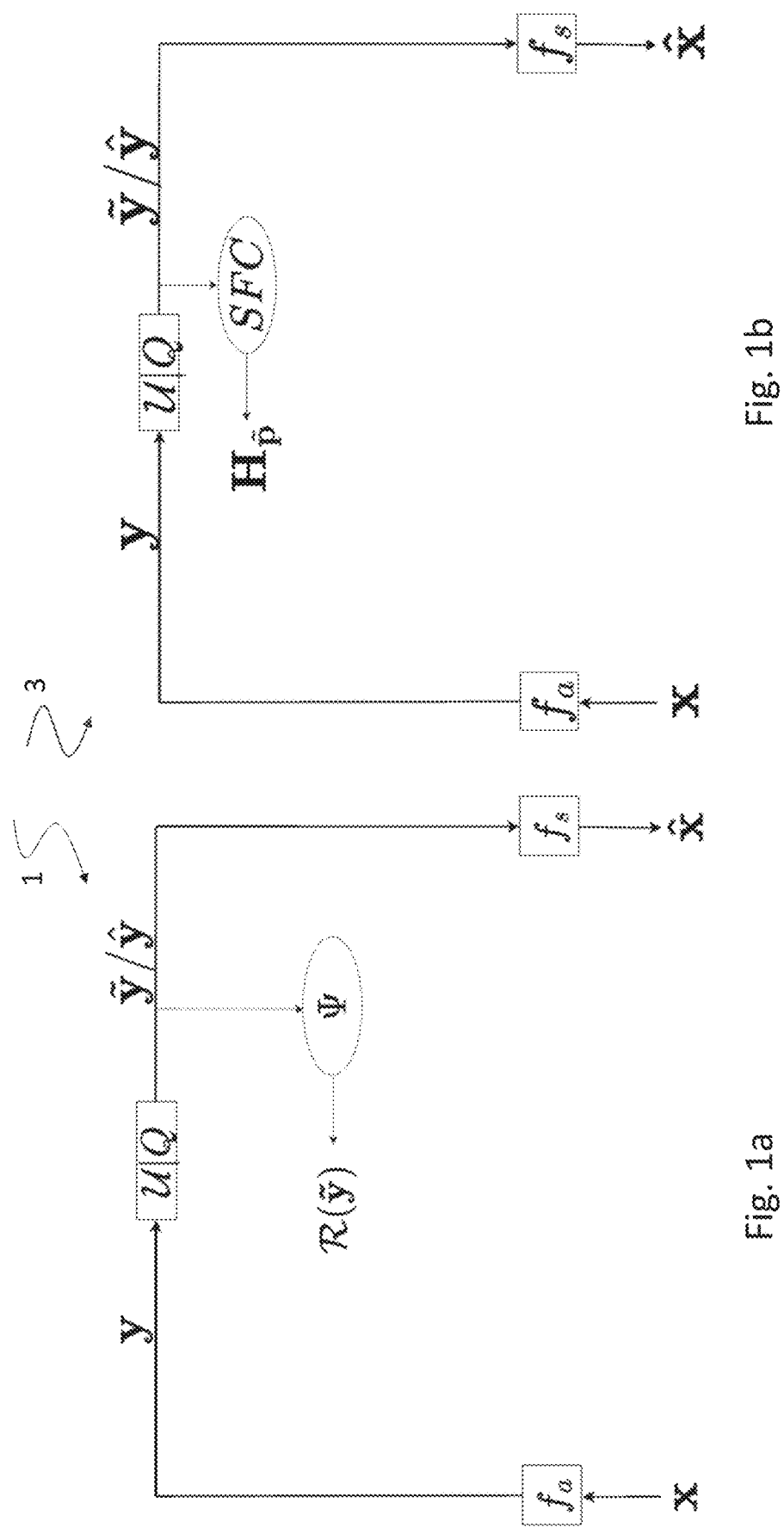
FIG. 1a schematically represents a prior art autoencoder architecture with a single latent representation modeled as a fully factorized distribution.
FIG. 1b schematically represents a first embodiment of an autoencoder architecture according to the invention.

With reference to FIG. 1b, it is represented a first embodiment of an autoencoder 3 solving the problem of non-differentiability of equation (5) by introducing a relaxed definition of the entropy based on a differentiable formulation of a soft frequency counter $SFC(l_i^j)$ associated with each level.

Given the j-th channel and a quantization level $l_i^j$, the desired formulation must associate every value of the latent space $y_n^j$ to a weight inversely proportional to the distance with $l_i^j$, where n varies within the same channel and ranges from 1 to $N_d$: in this way, by adding all the weights together, a soft counter is obtained which is higher for most representative levels.

Figure 3:
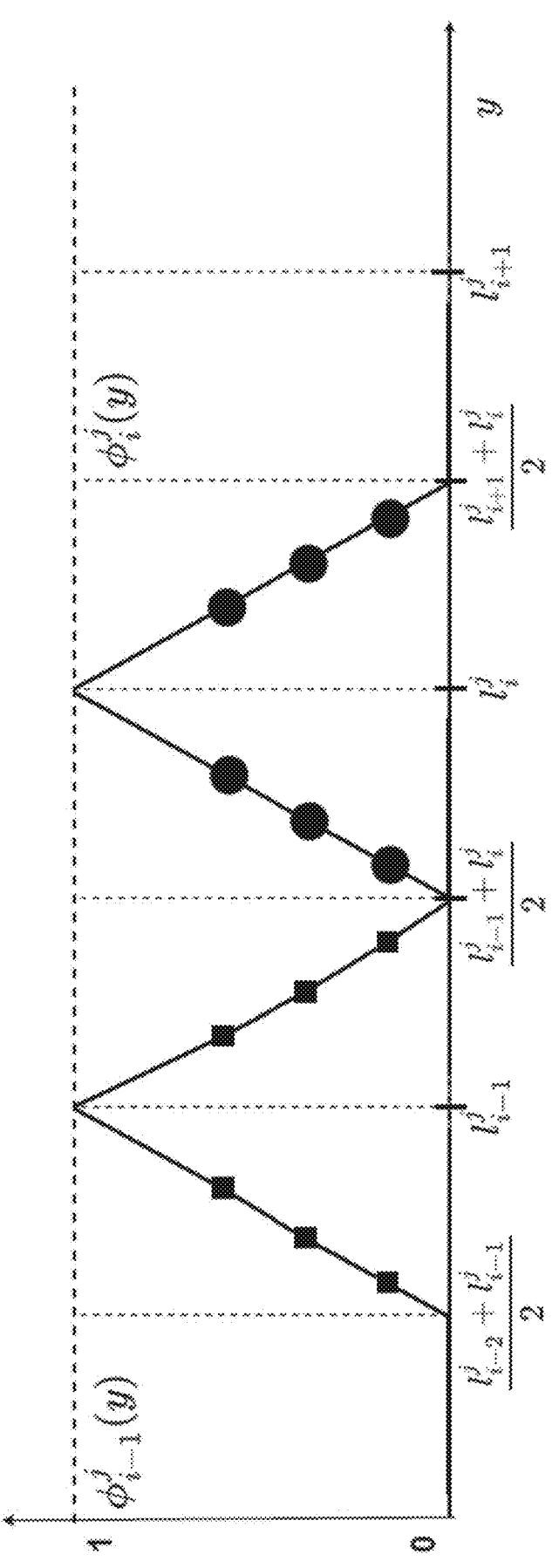
FIG. 3 shows a function used to associate weights to a specific quantization level.
Figures 4A, 4B:
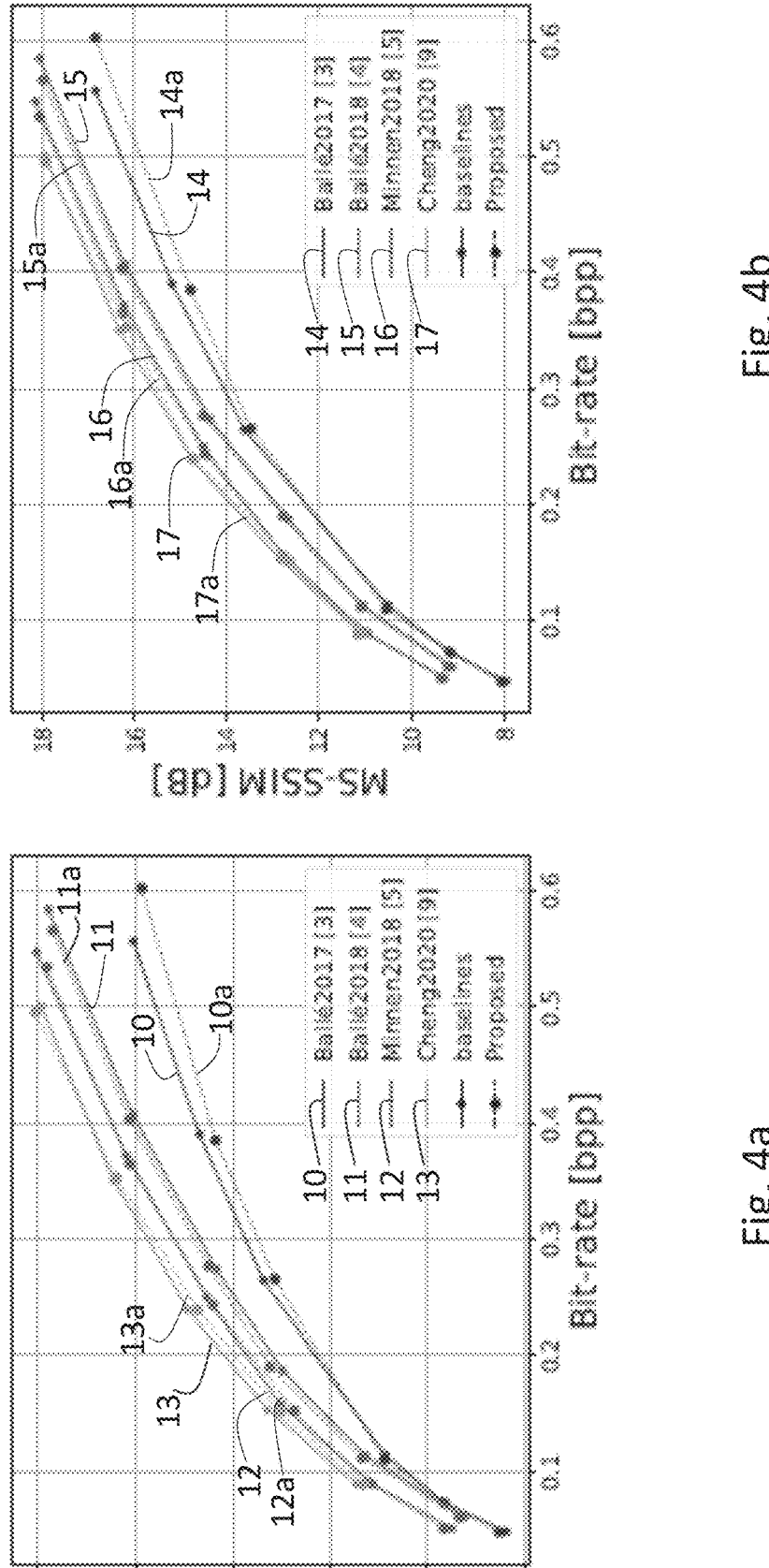
FIGS. 4a and 4b respectively show comparison of R-D performances, namely PSNR and MS-SSIM, between encoders according to the prior art and to the present invention, said performances being averaged on images of a first dataset.
Figures 5A, 5B:
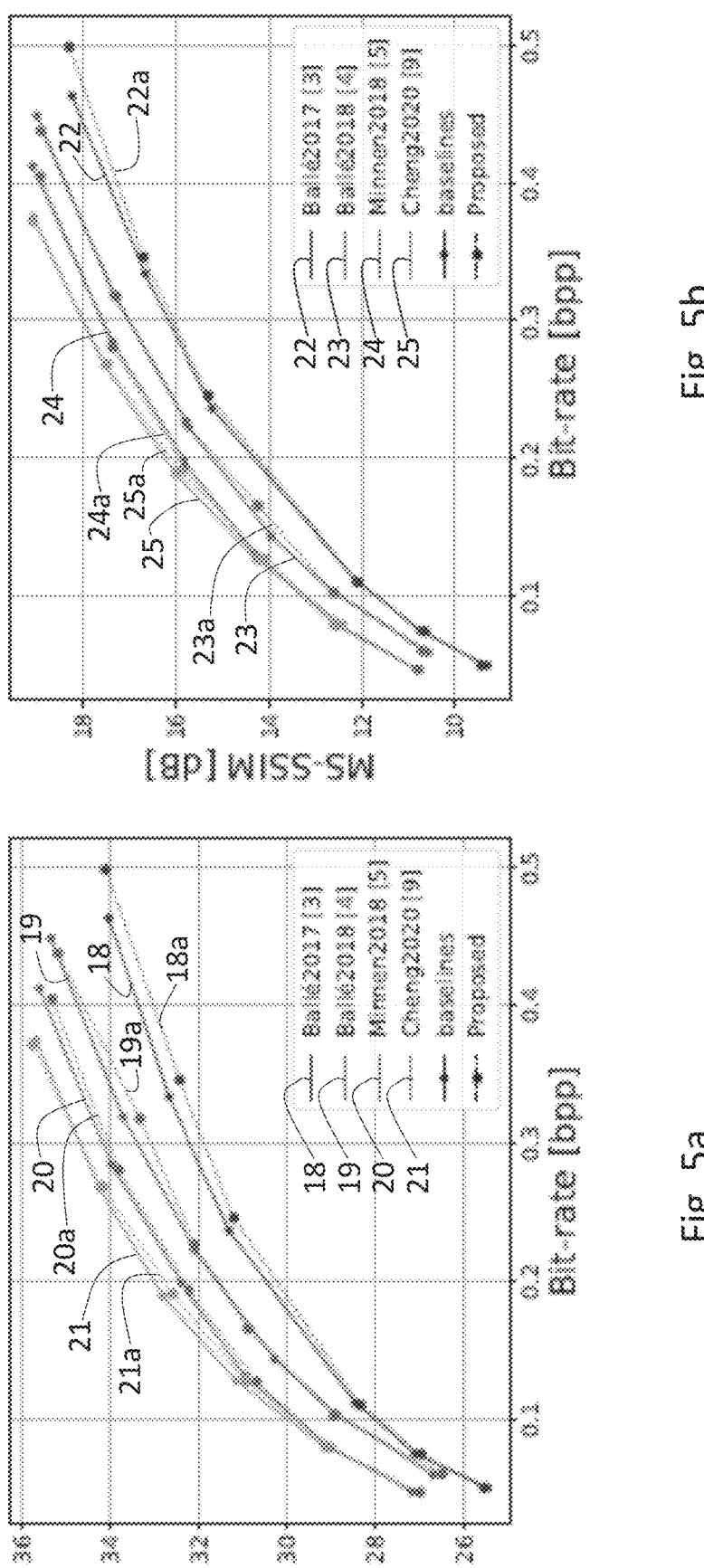
FIGS. 5a and 5b respectively show comparison of R-D performances, namely PSNR and MS-SSIM, between encoders according to the prior art and to the present invention, said performances being averaged on images of a second dataset.

To model such a mechanism, the soft frequency counter $SFC(l_i^j)$ according to the invention relies on a scalar function $\phi_i^j$, whose behaviour is depicted in FIG. 3.

Given the considered level $l_i^j$, any value of y that lies outside the quantization range has zero weight, thus not contributing to the soft frequency counter $SFC(l_i^j)$; on the contrary, values within the quantization range are linearly weighted according to the distance to the center, obviously with maximum weight equal to 1 when $y=l_i^j$. Being a relaxed approximation of the frequency counter for y, results can be normalized among the different levels, obtaining thus relaxed statistical frequency for estimating probability distribution $\tilde{p}_j$ for every single channel. In particular, we have that $$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC(l_i^j)\log_2\left[SFC(l_i^j)\right], \quad (6)$$

where $$SFC(l_i^j) = \frac{\sum_{n=1}^{N_d}\phi_i^j(y_n^j)}{\sum_{m=1}^{L}\sum_{n=1}^{N_d}\phi_m^j(y_n^j)} \quad (7)$$

-continued and $$\phi_i^j\left(y_n^j\right) = \begin{cases} 1 - \left(2 \cdot \left|y_n^j - l_i^j\right|\right) & \text{if } \left|y_n^j - l_i^j\right| < 0.5 \\ 0 & \text{otherwise} \end{cases} \tag{8}$$

Relaxation of the entropy represented by equation (6) makes it advantageously possible to directly minimize it during the training phase, so it can be inserted in RD cost functions.

Since the formulation according to the invention is consistent with the frequency statistics, at inference time this relaxation is advantageously replaced by the actual frequency statistics of a limited batch of images.

The entropy model according to the invention can be plugged into the cost function minimized when training a generic learned image compression algorithm.

The model according to the invention is advantageously agnostic to the underlying autoencoder architecture, so it can be in principle plugged into any learnable image compression scheme.

Figures 2A, 2B:
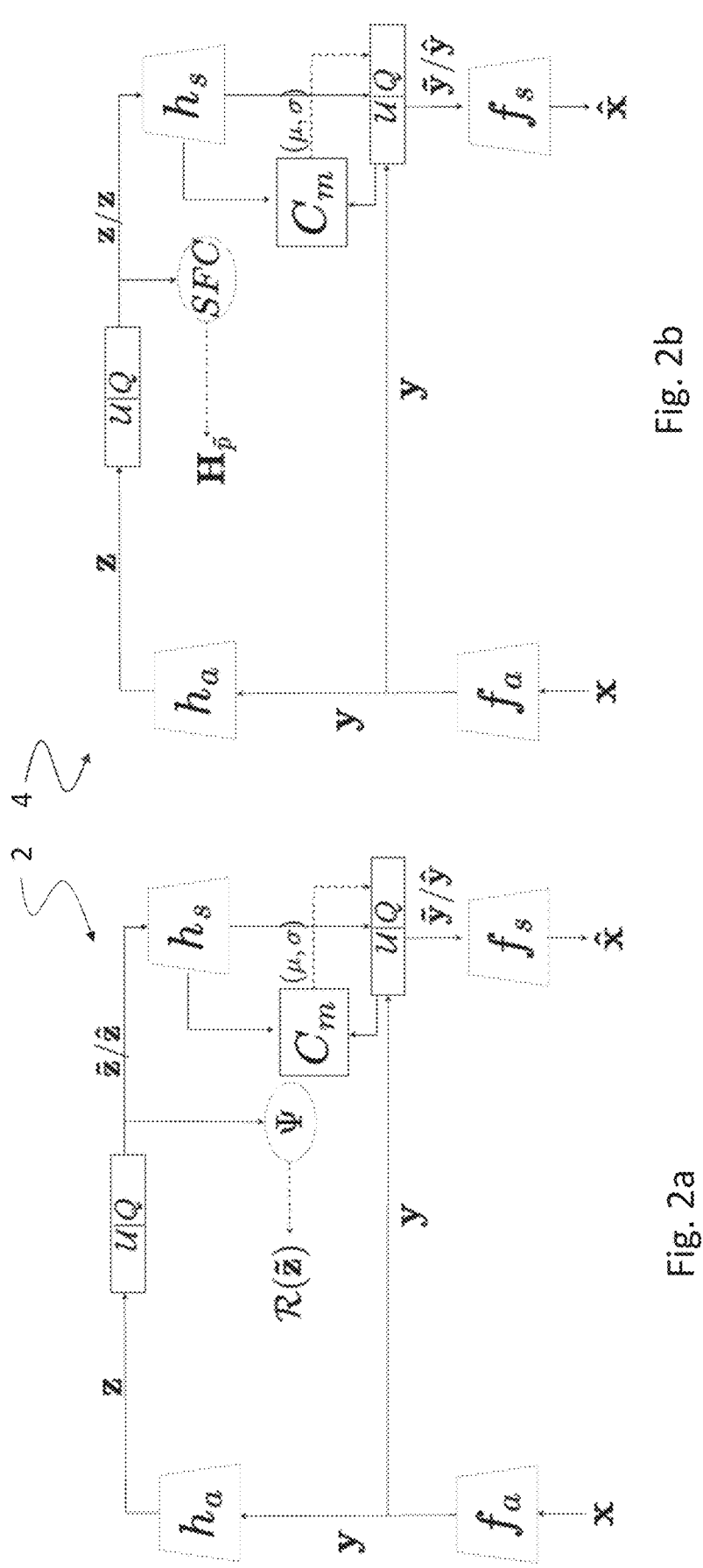
FIG. 2a schematically represents a prior art autoencoder hyperprior-based architecture with a context model.
FIG. 2b schematically represents a second embodiment of an autoencoder architecture according to the invention.

To show some examples, the method is applied to the autoencoders of references [2], [3], [4], [8], depicted in FIGS. 1a and 2a. Namely, it is shown how to replace in equations (1) and (4) the terms related to $\hat{y}$ and $\hat{z}$ respectively, which are the latent space modeled using the relaxed frequency statistics counter according to the invention.

The replacement of the auxiliary network $\Psi$ with the soft frequency counter SFC according to the invention allows to obtain an autoencoder 3 according to a first embodiment of the invention (FIG. 1b) and an autoencoder 4 according to a second embodiment of the invention (FIG. 2b).

In particular, for a model based on architecture according to reference [2], the cost function becomes:

$$L = \lambda \cdot d(x, \hat{x}) + H_{\hat{p}_y} \tag{9}$$

For hyperprior-based architectures like those described in references [3], [4] and [8], the cost function turns into $$L = \lambda \cdot d(x, \hat{x}) + R(\hat{y} \mid \hat{z}) + H_{\hat{p}_z} \tag{10}$$

Each architecture can then be advantageously trained via standard gradient descent as usual.

To use learned image compression architectures at inference time, it is necessary to extract the entropy model for the arithmetic codec first: while standard frameworks like those described in references [3], [4] and [8] exploit neural network $\Psi$ trained on the whole dataset, in the model according to the present invention it is enough to compute the entropy model by applying equation (7) using as input of equation (8) the quantized latent space $\hat{y}$ of a small subset of the training set, whose size is denoted as $\omega$, and use them as actual probability distribution of the latent space.

Later in this description, it will be proved how this strategy allows for easy adaptation of the entropy model with some temporal context.

It is now experimenting with the entropy model according to the invention over four state-of-the-art learnable image compression schemes described in references [2], [3], [4], [8], each of them with different characteristics and architectures.

At first, all the details are given about how both the autoencoders of references [2], [3], [4] and [8], and the architectures according to the present invention are trained; then the results obtained according to the present invention are evaluated in terms of rate-distortion performance on two distinct datasets, namely the dataset of Eastman Kodak Company, Kodak Lossless True Color Image Suite, 1999 [reference 13] and the CLIC validation dataset, Toderici G., et al., E. Workshop and challenge on learned image compression, CVPR, 2021 [reference 14].

It is also investigated how the method according to the present invention allows a faster convergence concerning the rate terms. In the end, it is proven how it is possible to adapt in a fast way the entropy model based on simple frequency statistics, showing performance in terms of BD-Rate and BD-PSNR on the Jvet dataset described in Joint Video Exploration Team (JVET) of ITU-T SG16 WP3 and ISO/IEC JTC1/SC29/WG11: JVET-G1010: "JVET common test conditions and software reference configurations, in 7th Meeting, 2017, Torino, Italy [reference 15].

As a final remark, the experiments according to the present invention aim at assessing the effectiveness of the entropy model according to the invention over different architectures, not comparing the relative performance.

As far as the training details are concerned, for an unbiased comparison, each architecture used was trained from scratch as for the reference algorithm. For the concerned models, the entropy model according to the present invention is plugged in equation (6) in lieu of the auxiliary neural network according to the prior art, and each architecture was retrained from scratch.

All models were trained over the Vimeo-90K dataset described in Xue T. et al., "Video Enhancement with Task-Oriented Flow", International Journal of Computer Vision (UCV), 2019, [reference 16] over 256×256 patches cropped at random from the training images, and multiple RD tradeoffs were obtained by properly imposing different values of $\lambda$, which ranges between 0.0009 and 0.045.

L=120 was heuristically set, meaning that the latent space was automatically bound in a range between −60 and 60. The initial learning rate was set to 1e−4 and it was halved whenever the cost function hit a plateau, with a patience of 20 epochs.

Each architecture was trained for 1-2 million steps and with batch sizes of 32 images. At inference time, the entropy model was extracted exploiting a subset of the training set, and a non-adaptive arithmetic coder was used to encode and decode the latent space, by fixing to =32.

All the experiments were performed leveraging the CompressAI library codebase as described in Bégaint, J. et al., "CompressAI: a PyTorch library and evaluation platform for end-to-end compression research", arXiv preprint arXiv: 2011.03029, 2020, [reference 17], the code being publicly available on https://github.com/EIDOSLAB/SFC.

FIGS. 4a,4b and FIGS. 5a,5b show quantitative performance in terms of both peak signal-to-noise ratio (PSNR) and multiscale structural similarity (MS-SSIM) over the Kodak image dataset (FIGS. 4a,4b) and the CLIC validation dataset (FIGS. 5a,5b), respectively.

For clarity, MS-SSIM was converted to $-10 \log_{10}(1-\text{MS-}$ SSIM). For each considered architecture, the solid line represents the reference scheme with the auxiliary neural network $\Psi$, whereas the dotted line represents the results obtained with the non-parametric entropy model according to the invention. For all the considered baseline models, the method according to the invention performs close if not identical to the original reference, especially at low bitrates.

It is pointed out that the performance gap is negligible for architectures where the entropy model according to the present invention is used to estimate the rate of a hyperprior latent space as in references [3], [4], and [8].

On the other hand, a little decrease in performance is visible concerning the autoencoder of reference [2]: however, it will be shown in the following how adapting the entropy model according to the present invention with a simple statistics computation closes this gap.

Besides the quantitative performance, it is investigated how the entropy model according to the present invention impacts the training process convergence.

Namely, the first 20 iterations of the architectures of references [2] and [8] are analyzed for $\lambda=0.0018$ and c=128.

Figures 6A, 6B:
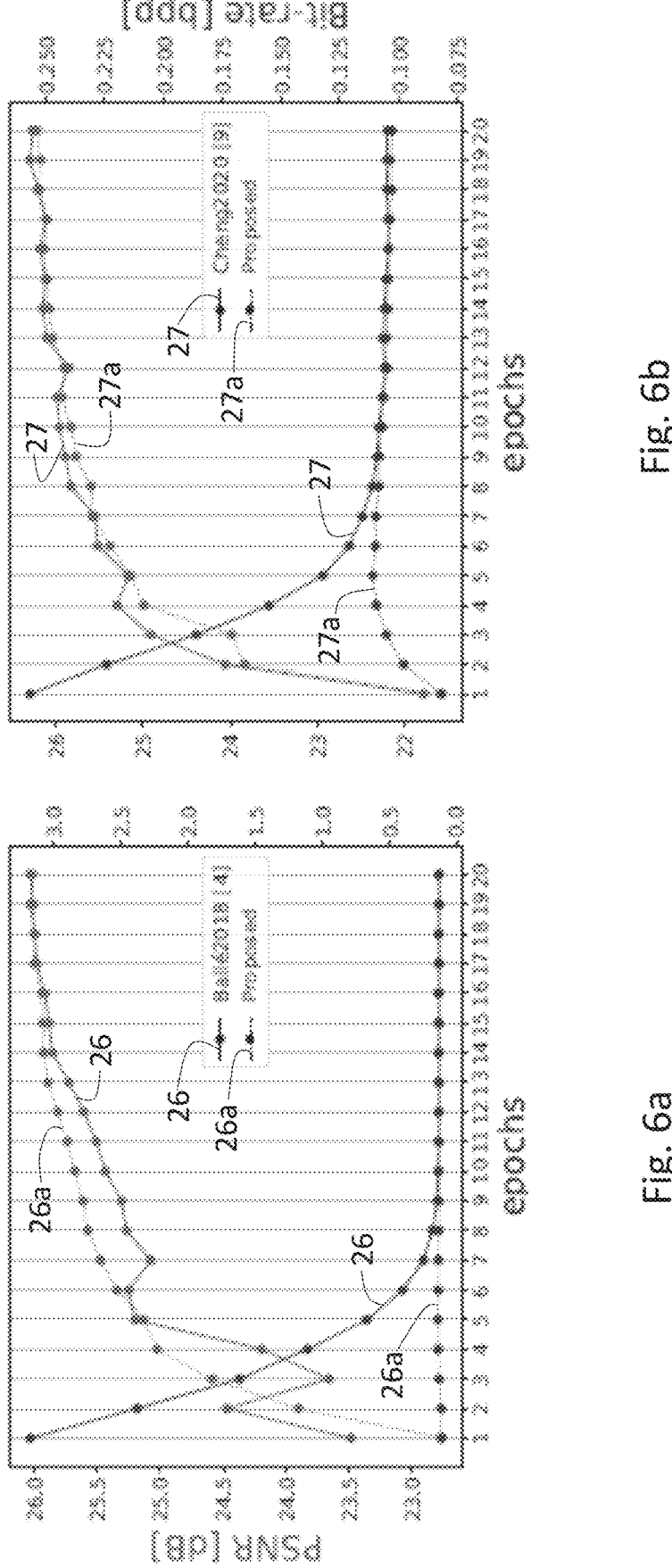
FIGS. 6a and 6b show convergence of the distortion and rate terms of a cost function.

FIG. 6a and FIG. 6b show both the rate and distortion terms of the minimized cost function for the architectures of references [2] (FIG. 6a) and [8] (FIG. 6b), respectively.

With the formulation proposed in the present invention, the rate term, representing the estimated entropy, converges in just a few epochs, while distortion drops regularly as for the references: this fact means that the formulation proposed in the present invention advantageously leads to a faster convergence to the stable configuration in terms of rate.

Figure 7B:
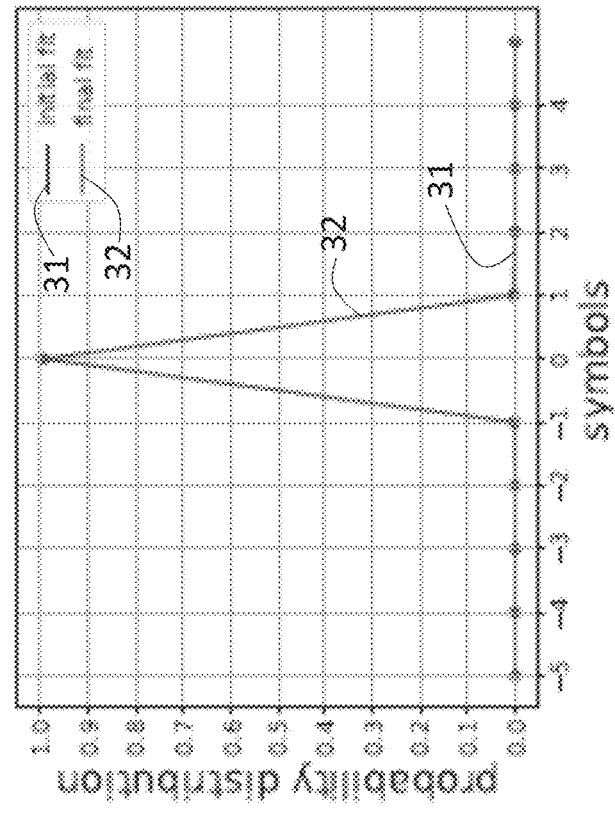
FIGS. 7a and 7b show a probability distribution of a first hyper-channel related to a prior art autoencoder trained according to the method of the present invention and to the prior art, respectively.
Figure 7A:
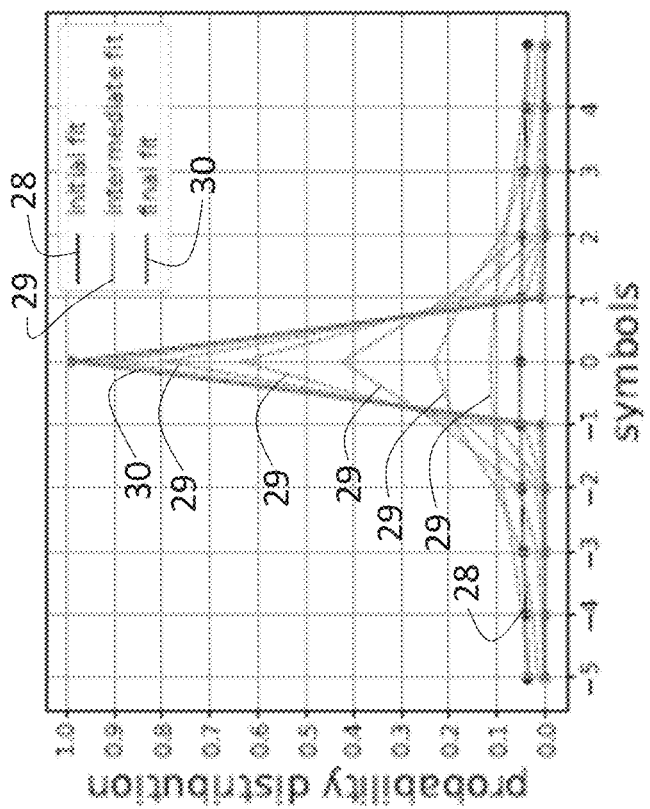

Typically, such frameworks automatically allocate bits to different channels, shrinking to zero any useless ones. This also applies to the formulation proposed in the present invention, but redundant channels are discarded more quickly, as it could already be imagined from FIGS. 6a,6b. This fact is shown in FIGS. 7a,7b where it is shown how the probability distribution of a specific channel, in this case, the first one, changes during the epoch, taking reference [8] as baseline.

While for reference [8] some intermediate steps are necessary for the final configuration, with the model according to the present invention it is advantageously immediate the achievement of the right distribution.

While modern video codecs rely on a context-adaptive arithmetic coder (CABAC), recently learned image codecs like those of references [2], [3], [4] and [8] involve the use of a fixed probability distribution extracted through the auxiliary neural network, that should be retrained in case of entropy model adaptation.

The entropy formulation according to the present invention is parametric-free since it is only based on equation (5) and can be updated to a given context by recomputing simple statistics.

To prove this point, the long JVET video sequences consisting of different contents at different resolutions (up to 4K, i.e. 2160p) were encoded using the very same architectures trained above (no retraining performed): the architectures of references [2] and [4] were taken as baselines, to consider cases where the method according to the present invention is applied to latent spaces of different types.

For the first frame only, it was relied on the entropy model computed at training time using the Vimeo dataset, since no temporal context was available. For extracting the distribution model, a batch of 32 images from the dataset was utilized.

However, for the following frames, the entropy model was adapted by averaging the current entropy distribution with frequency statistics of the previous frame, calculated using equation (7).

As two adjacent frames of the same sequence are in most cases very similar, so are expected to be the distributions of the relative latent spaces.

To make a more fair comparison, this method was also experimented with a sampling rate of 16, meaning that the entropy model was adapted every 16-th frames only instead of exploiting every single one: this configuration is more similar to the one used by classic codecs.

FIG. 8 shows the gains in terms of BD-Rate (rate reduction for equivalent distortion, lower is better) and BD-PSNR (distortion reduction for equivalent rate, higher is better, see Bjontegaard G., "Calculation of average PSNR differences between RD-curves", VCEG-M33, 2001, [reference 18]), using as a reference the case the architecture where a neural network estimates the rate.

Thanks to adaptive entropy modeling, the BD-Rate improves beyond 10% concerning reference [2], which was previously the worst result, closing the gap with the reference model.

These gains are attributed to the fact that in reference [2] all the information required to reconstruct the image is encoded in the latent space whose entropy the model according to the present invention accounts for, whereas in reference [4] only the hyperprior latent representation is modeled.

Figure 9A:
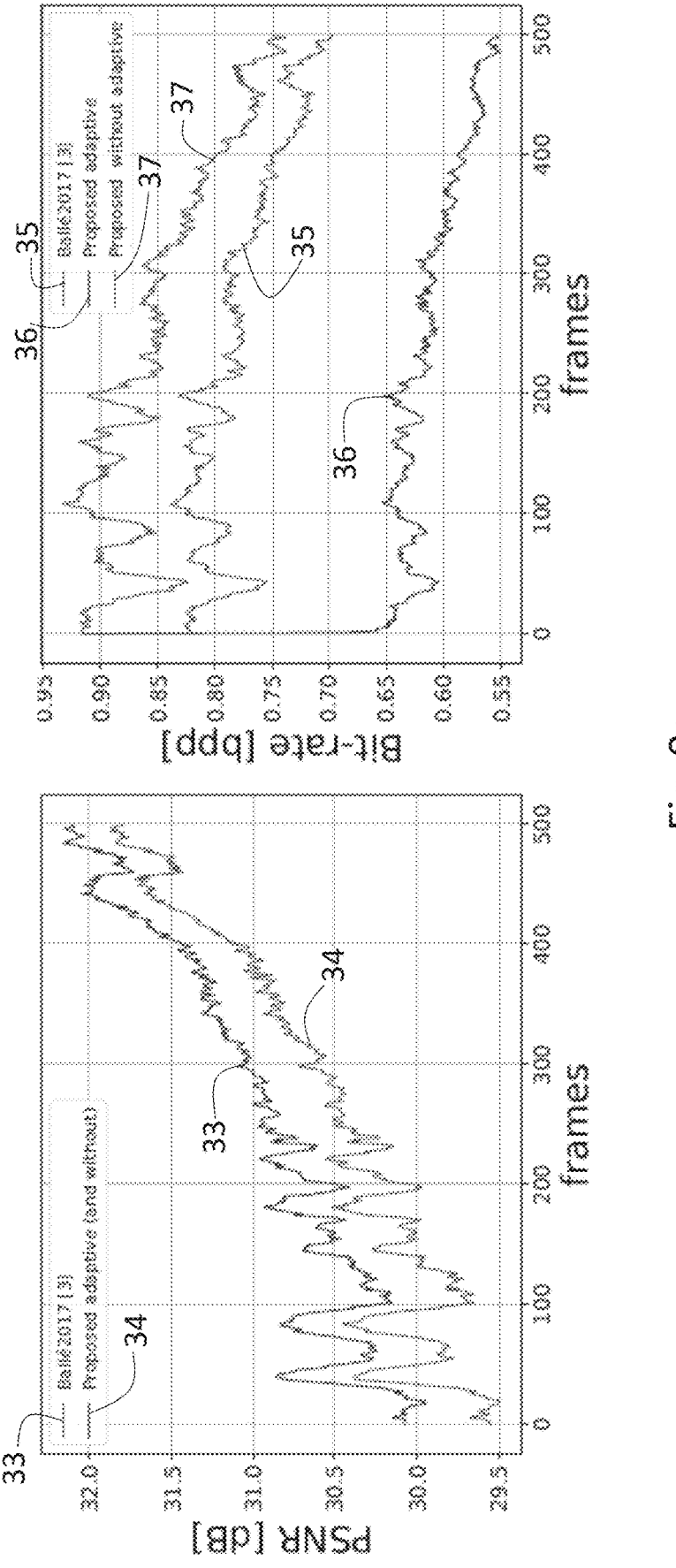
FIGS. 9a and 9b show the results obtained on a particular image sequence, when adapting every frame or every 16-th frame, respectively.
Figure 9B:
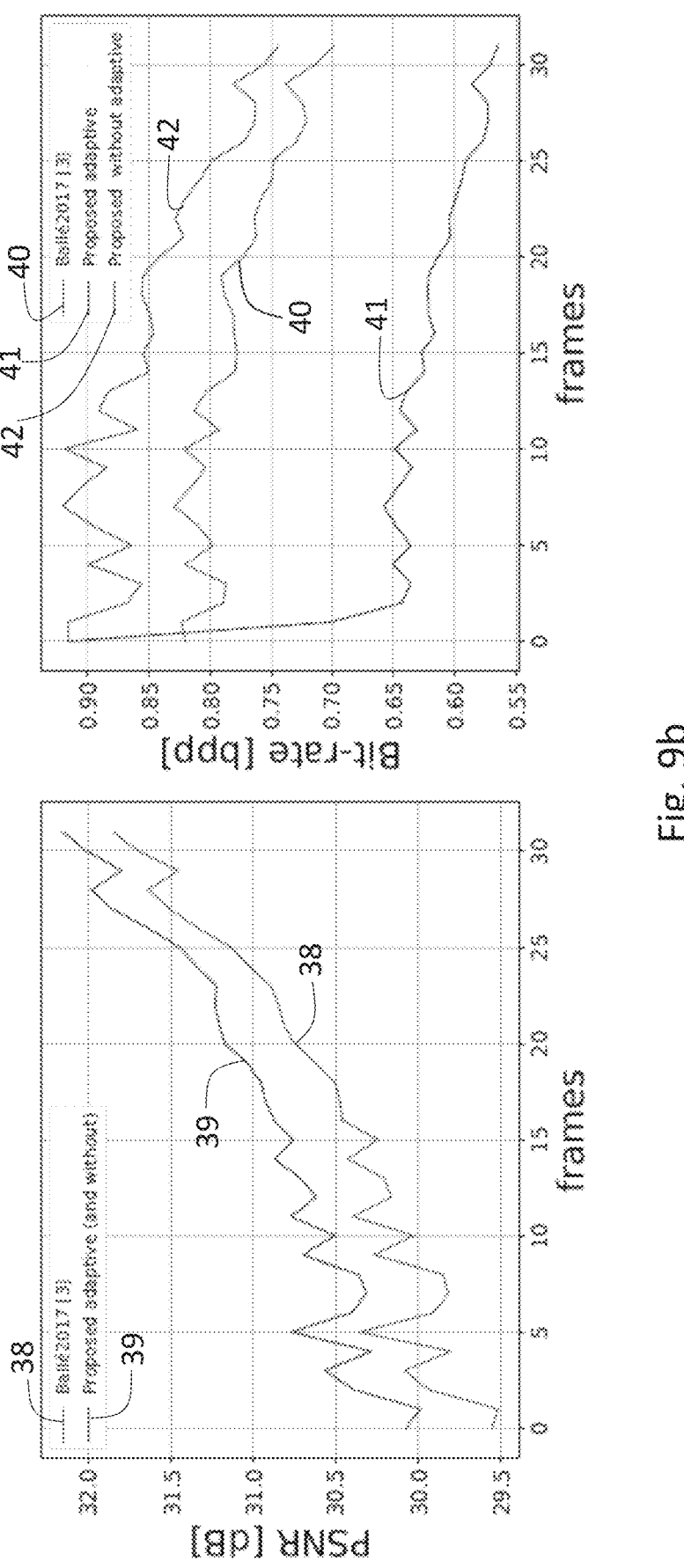

FIGS. 9a and 9b illustrate the performance trend for the "partyscene" sequence, adapting the entropy model every frame and every 16-th frame, respectively. The lines in the FIG. 9b represent the results with and without adaptation, respectively.

As it is possible to observe, in both cases refining the entropy model by exploiting temporal context yields about a 10% better rate, without affecting the distortion results.

According to the invention, a differentiable and non-parametric model of the latent space entropy as a proxy of the rate into the RD cost function is proposed.

The model according to the invention is built around a soft statistical counter that attributes to each quantization level a value proportional to its effective frequency in a specific channel of the latent space, and which once normalization occurred could be used as a proxy of the entropy model.

Experimental results with four different learned image compression architectures show performance similar to the case where a neural network estimates the latent space rate and proves that the formulation according to the invention achieves a stable solution faster to reference models.

Moreover, it is advantageously possible to update the entropy distribution by exploiting temporal content without any retraining, achieving overall slight improvements in the performance.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalents parts and elements without departing from the basic inventive idea, as set out in the following claims.

The invention claimed is:

1. A method for learned image compression implemented in an autoencoder comprising a learnable encoder ($f_a$) and a decoder ($f_s$), said method comprising the steps of:
   a) extracting from an image (x) a latent space (y) by means of said learnable encoder ($f_a$);
   b) quantizing said latent space (y) by means of a quantizer (U|Q) to obtain a quantized latent space ($\hat{y}$);
   c) entropy coding said quantized latent space ($\hat{y}$) by means of an entropy encoder to obtain a bitstream, wherein an entropy model used to encode said latent space (y) is represented by a probability distribution $p_{\hat{y}}$;

d) entropy decoding said bitstream by means of an entropy decoder to obtain an entropy decoded bitstream;

e) feeding said entropy decoded bitstream to said decoder ($f_s$);

f) recover a reconstructed image ($\hat{x}$) by means of said decoder ($f_s$);

g) training said autoencoder via standard gradient descent of the backpropagated error gradient by finding learnable parameters ($\theta_f, \theta_g$) of said learnable encoder ($f_a$) and of said decoder ($f_s$) that minimize a rate distortion cost function L, wherein said entropy encoder is based on a differentiable formulation of a soft frequency counter (SFC).

2. The method according to claim 1, wherein said latent space (y) comprises a number $N_c$ of latent space channels having a dimension $N_d$, and wherein, given a j-th channel of said latent space (y) and a quantization level $l_i^j$ of said j-th channel, the soft frequency counter (SFC) associates every value of said latent space $y_n^j$ to a weight inversely proportional to the distance with $l_i^j$, where n varies within the same channel and ranges from 1 to $N_d$.

3. The method according to claim 2, wherein said soft frequency counter (SFC) relies on a scalar function $\phi_i^j$ and wherein a first order entropy $H_{\tilde{p}}$ of a probability distribution $\tilde{p}_j$ for every single channel of said latent space is:

$$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC(l_i^j)\log_2\left[SFC(l_i^j)\right]$$

where $$SFC(l_i^j) = \frac{\sum_{n=1}^{N_d}\phi_i^j(y_n^j)}{\sum_{m=1}^{L}\sum_{n=1}^{N_d}\phi_m^j(y_n^j)}$$

and $$\phi_i^j(y_n^j) = \begin{cases} 1-(2\cdot|y_n^j - l_i^j|) & \text{if } |y_n^j - l_i^j| < 0.5 \\ 0 & \text{otherwise} \end{cases}.$$

4. The method according to claim 1, wherein said cost function L is $$L = \lambda\cdot d(x,\hat{x}) + H_{\tilde{p}_y}$$

where $d(x,\hat{x})$ is a reconstruction error, $H_{\tilde{p}_y}$ is a rate of a soft quantized latent space, and $\lambda$ regulates a trade-off between said reconstruction error and said rate of the soft quantized latent space.

5. The method for learned image compression implemented in an autoencoder comprising a learnable encoder ($f_a$) and a decoder ($f_s$), said method comprising the steps of:

a) extracting from an image (x) a latent space (y) by means of said learnable encoder ($f_a$);

b) encoding by means of an auxiliary encoder ($h_a$) said latent space (y) to capture spatial dependencies among said latent space (y) to obtain a hyperprior representation (z) of said latent space (y);

c) quantizing said hyperprior representation (z) by means of a quantizer (U|Q) to obtain a quantized hyperprior representation ($\hat{z}$);

d) entropy coding said quantized hyperprior representation ($\hat{z}$) by means of an entropy encoder to obtain a bitstream, wherein an entropy model used to encode said quantized hyperprior representation ($\hat{z}$) is represented by a probability distribution $p_{\hat{z}}$;

e) entropy decoding said bitstream by means of an auxiliary entropy decoder ($h_s$) to obtain an entropy decoded bitstream;

f) quantizing said entropy decoded bitstream to obtain a quantized latent space ($\hat{y}$);

g) feeding said entropy decoded bitstream to said decoder ($f_s$);

h) recover a reconstructed image ($\hat{x}$) by means of said decoder ($f_s$);

i) training said autoencoder via standard gradient descent of the backpropagated error gradient by finding learnable parameters ($\theta_f, \theta_g$) of said learnable encoder ($f_a$) and of said decoder ($f_s$) that minimize a rate distortion cost function L, wherein said entropy encoder is based on a differentiable formulation of a soft frequency counter (SFC).

6. The method according to claim 5, wherein said hyperprior representation (z) comprises a number $N_c$ of latent space channels having a dimension $N_d$, and wherein, given a j-th channel of said hyperprior representation (z) and a quantization level $l_i^j$ of said j-th channel, the soft frequency counter (SFC) associates every value of said latent hyperprior representation $z_n^j$ to a weight inversely proportional to the distance with $l_i^j$, where n varies within the same channel and ranges from 1 to $N_d$.

7. The method according to claim 5, wherein said soft frequency counter (SFC) relies on a scalar function $\phi_i^j$ and wherein a first order entropy $H_{\tilde{p}}$ of a probability distribution $\tilde{p}_j$ for every single channel of said latent space is:

$$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC(l_i^j)\log_2\left[SFC(l_i^j)\right]$$

where $$SFC(l_i^j) = \frac{\sum_{n=1}^{N_d}\phi_i^j(y_n^j)}{\sum_{m=1}^{L}\sum_{n=1}^{N_d}\phi_m^j(y_n^j)}$$

and $$\phi_i^j(y_n^j) = \begin{cases} 1-(2\cdot|y_n^j - l_i^j|) & \text{if } |y_n^j - l_i^j| < 0.5 \\ 0 & \text{otherwise} \end{cases}.$$

8. The method according to claim 7, wherein said cost function L is $$L = \lambda\cdot d(x,\hat{x}) + R(\hat{y}\,|\,\hat{z}) + H_{\tilde{p}_z}$$

where $d(x,\hat{x})$ is the reconstruction error, $H_{\tilde{p}_z}$ is a rate of a soft quantized latent space, $R(\hat{y}|\hat{z})$ is a rate of the hyperprior representation, and $\lambda$ regulates a trade-off between said reconstruction error, said rate of the soft quantized latent space and said rate of the hyperprior representation.

9. An autoencoder for learned image compression comprising:

a learnable encoder ($f_a$) adapted to extract from an image (x) a latent space (y);

a quantizer (U|Q) adapted to quantize said latent space (y) to obtain a quantized latent space ($\hat{y}$);

an entropy encoder adapted to entropy coding said quantized latent space ($\hat{y}$) to obtain a bitstream, wherein an entropy model used to encode said latent space (y) is represented by a probability distribution $p_{\hat{y}}$;

an entropy decoder adapted to decode said bitstream;

a decoder ($f_s$) adapted to recover a reconstructed image ($\hat{x}$) from said entropy decoded bitstream;

said autoencoder being configured to be trained via standard gradient descent of the backpropagated error gradient by finding learnable parameters ($\theta_f, \theta_g$) of said learnable encoder ($f_a$) and of said decoder ($f_s$) that minimize a rate distortion cost function L, wherein said entropy encoder comprises a soft frequency counter (SFC) based on a differentiable formulation.

10. The autoencoder according to claim 9, wherein said latent space (y) comprises a number $N_c$ of latent space channels having a dimension $N_d$, and wherein, given a j-th channel of said latent space (y) and a quantization level $l_i^j$ of said j-th channel, the soft frequency counter (SFC) is adapted to associate every value of said latent space $y_n^j$ to a weight inversely proportional to the distance with $l_i^j$, where n varies within the same channel and ranges from 1 to $N_d$.

11. The autoencoder according to claim 10, wherein said soft frequency counter (SFC) relies on a scalar function $\phi_i^j$ and wherein a first order entropy $H_{\tilde{p}}$ of a probability distribution $\tilde{p}_j$ for every single channel of said latent space is:

$$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC\left(l_i^j\right)\log_2\left[SFC\left(l_i^j\right)\right]$$

where $$SFC\left(l_i^j\right) = \frac{\sum_{n=1}^{N_d}\phi_i^j\left(y_n^j\right)}{\sum_{m=1}^{L}\sum_{n=1}^{N_d}\phi_m^j\left(y_n^j\right)}$$

and $$\phi_i^j\left(y_n^j\right) = \begin{cases} 1 - \left(2\cdot\left|y_n^j - l_i^j\right|\right) & \text{if } \left|y_n^j - l_i^j\right| < 0.5 \\ 0 & \text{otherwise} \end{cases}.$$

12. The autoencoder according to claim 9, wherein said cost function L is $$L = \lambda \cdot d(x, \hat{x}) + H_{\tilde{p}_y}$$

where $d(x, \hat{x})$ is a reconstruction error, $H_{\tilde{p}_y}$ is a rate of a soft quantized latent space, and $\lambda$ regulates a trade-off between said reconstruction error and said rate of the soft quantized latent space.

13. An autoencoder for learned image compression comprising:

a learnable encoder ($f_a$) adapted to extract from an image (x) a latent space (y);

an auxiliary encoder ($h_a$) adapted to encode said latent space (y) to capture spatial dependencies among said latent space (y) to obtain a hyperprior representation (z) of said latent space (y);

a quantizer (U|Q) adapted to quantize said hyperprior representation (z) to obtain a quantized hyperprior representation ($\hat{z}$);

an entropy encoder adapted to entropy coding said quantized hyperprior representation ($\hat{z}$) to obtain a bitstream, wherein an entropy model used to encode said quantized hyperprior representation ($\hat{z}$) is represented by a probability distribution $p_{\hat{z}}$;

an auxiliary entropy decoder ($h_s$) adapted to entropy decoding said bitstream to obtain an entropy decoded bitstream;

a second quantizer (U|Q) adapted to quantize said entropy decoded bitstream to obtain a quantized latent space ($\hat{y}$);

a decoder ($f_s$) adapted to recover a reconstructed image ($\hat{x}$) from said entropy decoded bitstream;

said autoencoder being configured to be trained via standard gradient descent of the backpropagated error gradient by finding learnable parameters ($\theta_f, \theta_g$) of said learnable encoder ($f_a$) and of said decoder ($f_s$) that minimize a rate distortion cost function L, wherein said entropy encoder is based on a differentiable formulation of a soft frequency counter (SFC).

14. The autoencoder according to claim 13, wherein said hyperprior representation (z) comprises a number $N_c$ of latent space channels having a dimension $N_d$, and wherein, given a j-th channel of said hyperprior representation (z) and a quantization level $l_i^j$ of said j-th channel, the soft frequency counter (SFC) associates every value of hyperprior representation $z_n^j$ to a weight inversely proportional to the distance with $l_i^j$, where n varies within the same channel and ranges from 1 to $N_d$.

15. The autoencoder according to claim 14, wherein said soft frequency counter (SFC) relies on a scalar function $\phi_i^j$ and wherein a first order entropy $H_{\tilde{p}}$ of a probability distribution $\tilde{p}_j$ for every single channel of said latent space is:

$$H_{\tilde{p}} = -\frac{1}{N_c}\sum_{j=1}^{N_c} H_{\tilde{p}_j} = -\frac{1}{N_c}\sum_{j=1}^{N_c}\sum_{i=1}^{L} SFC\left(l_i^j\right)\log_2\left[SFC\left(l_i^j\right)\right]$$

where $$SFC\left(l_i^j\right) = \frac{\sum_{n=1}^{N_d}\phi_i^j\left(y_n^j\right)}{\sum_{m=1}^{L}\sum_{n=1}^{N_d}\phi_m^j\left(y_n^j\right)}$$

and $$\phi_i^j\left(y_n^j\right) = \begin{cases} 1 - \left(2\cdot\left|y_n^j - l_i^j\right|\right) & \text{if } \left|y_n^j - l_i^j\right| < 0.5 \\ 0 & \text{otherwise} \end{cases}.$$

16. The autoencoder according to claim 15, wherein said cost function L is $$L = \lambda \cdot d(x, \hat{x}) + R(\hat{y}\,|\,\hat{z}) + H_{\tilde{p}_z}$$

where $d(x, \hat{x})$ is a reconstruction error, $H_{\tilde{p}_z}$ is a rate of a soft quantized latent space, $R(\hat{y}|\hat{y})$ is a rate of the hyperprior representation, and $\lambda$ regulates the trade-off between said reconstruction error, said rate of the soft quantized latent space and said rate of the hyperprior representation.

\* \* \* \* \*